(No Model.)
F. J. FRANCE.
HAND FERTILIZER DROPPER.
No. 576,497. Patented Feb. 2, 1897.
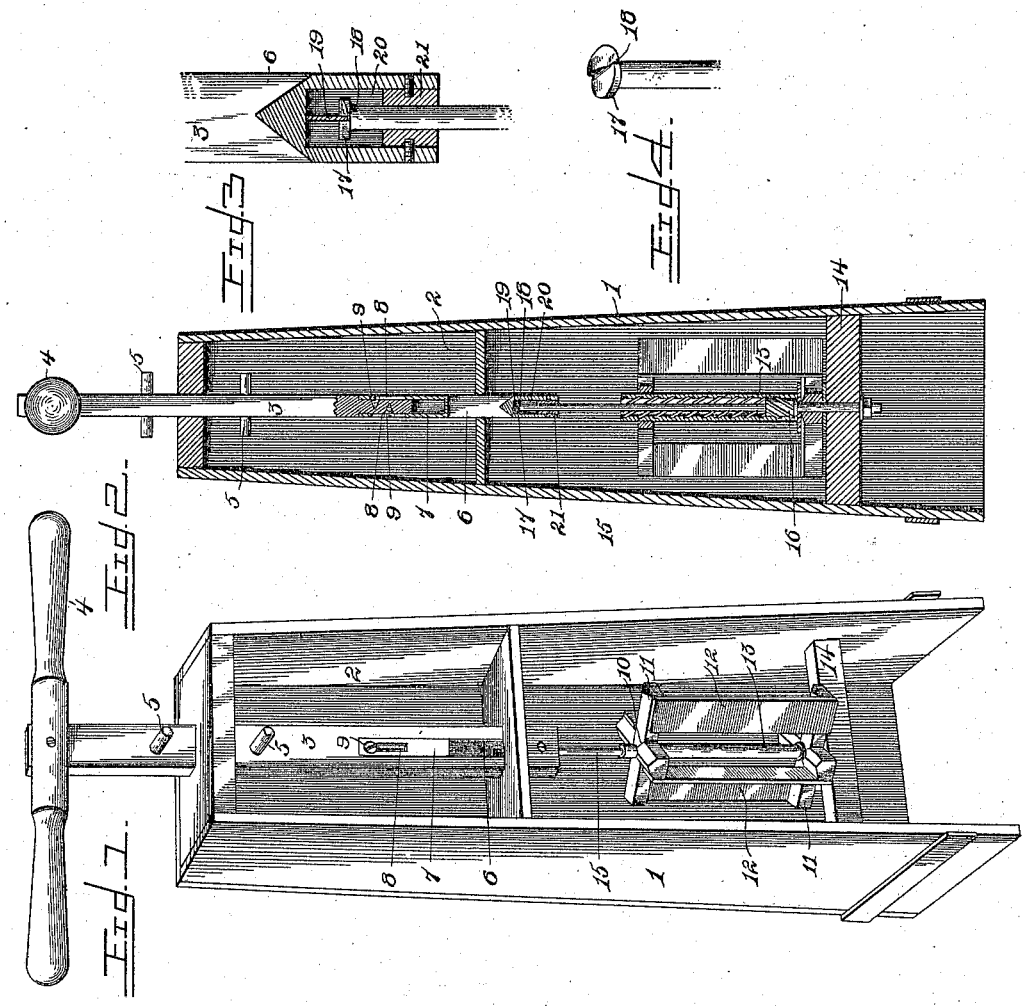
Witnesses
W. J. LaVarn
V. B. Hillyard.
Inventor
Flavius J. France.
By his Attorneys,
C. A. Snow & Co.

UNITED STATES PATENT OFFICE.

FLAVIUS JOSEPHUS FRANCE, OF ELKTON, KENTUCKY.

HAND FERTILIZER-DROPPER.

SPECIFICATION forming part of Letters Patent No. 576,497, dated February 2, 1897.

Application filed October 28, 1895. Serial No. 567,206. (No model.)

*To all whom it may concern:*

Be it known that I, FLAVIUS JOSEPHUS FRANCE, a citizen of the United States, residing at Elkton, in the county of Todd and State of Kentucky, have invented a new and useful Hand Fertilizer-Dropper, of which the following is a specification.

This invention relates to hand devices for distributing fertilizer and seed. By providing a fan and combining it with a device of this character the fertilizer or grain will be scattered over a larger area than is possible by implements of this character as heretofore generally constructed.

An important feature is to provide for regulating the quantity of fertilizer or grain to be distributed at each operation of the device and to disconnect the plunger from the fan in such a manner that the fan can continue to revolve while the plunger is returning to an initial position, thereby preventing a straining of the parts when operating the plunger quickly and suddenly.

Other objects will appear to those conversant with the art as the nature of the improvement is appreciated, and to a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a perspective view of a hand fertilizer-distributer or seed-dropper embodying the principles of this invention, the near side of the casing being removed. Fig. 2 is a transverse section thereof. Fig. 3 is a detail view in section of the adjacent ends of the plunger and fan-operating stem. Fig. 4 is a detail view of the upper end of the fan-operating stem.

Similar and corresponding parts are referred to in the subjoined description and indicated in the several views of the accompanying drawings by the same reference-characters.

The casing 1 for inclosing the operating parts may be of any desired construction and preferably tapers throughout its length, the lower end being the larger and open. A compartment 2 is formed in the upper end of the casing to receive the fertilizer or seed, and a plunger 3 operates through this compartment to distribute the fertilizer or seed in desired quantity. For convenience in operating the plunger it is provided at its upper end with a handle 4, and to limit the movements of the plunger it is provided with pins or stops 5, arranged to come the one above the other below the top end of the casing.

A slot or opening 6 is formed in the plunger near its lower end and receives the charge of fertilizer or grain to be dropped each time the plunger is depressed. The lower end of the slot or opening 6 inclines in opposite directions from an intermediate line, the slant being sufficiently steep to prevent the lodgment of the fertilizer or grain in the slot or opening and insuring a full discharge thereof. The capacity of the slot or opening 6 can be varied, so that the quantity of fertilizer or grain to be dropped at each operation of the plunger can be regulated, and to effect this end a slide 7 is vertically adjustably connected with the plunger, and its lower end forms the upper end of the slot or opening. Hence by adjusting the slide the desired result is attained. This slide, as shown, is formed from a strip of metal doubled upon itself midway of its ends, presenting a U-shaped appearance, and the side members embrace the sides of the plunger above the slot or opening 6 and are let into mortises therein, so as to come flush with the sides of the plunger. Slots 8 are formed in the side members of the slide and receive binding-screws 9, by means of which the slide is held in the located or adjusted position.

A fan 10 is located in the lower part of the casing and comprises similarly-constructed upper and lower heads 11, vertical blades 12, connecting corresponding arms of the heads 11, and a centrally-disposed barrel 13. This fan is suitably journaled at its lower end upon a cross-bar 14, and a stem 15, operating in the barrel 13, obtains a bearing in the lower end of the plunger 3, thereby holding the fan in fixed and operative relation. The heads 11 comprise radial arms which incline in opposite directions on their top sides to obviate lodgment of the fertilizer or grain thereon and to shed the same, thereby insuring a distribution of all of each charge dropped by the downward movement of the plunger. The barrel 13 is rifled, and the lower end of the stem 15 has a head 16 of corresponding shape to the rifled barrel, so that upon reciprocating the stem 15 within the barrel the latter and the fan will be rotated. A head 17 is formed at the upper end of the stem 15 and has a transverse crease or groove 18 across its upper end, the same as provided in a wood-screw, to receive the end of a screw-driver, and the portions of the head upon opposite sides of the crease or groove 18 are beveled or inclined from one end to admit of the blade 19 riding out of the crease or groove and upon the head 17 when the fan is rotating and the plunger is stationary or returning to an initial position. The head 17 enters an opening 20 in the lower end of the plunger and is held therein by a collar or sleeve 21, secured in the lower end of the opening 20 in any convenient way.

The blade 19 is located at the upper end of the opening 20 and performs the same office as the point of a screw-driver, and is adapted to enter the crease or groove 18 when depressing the plunger, so as to rotate the fan by holding the stem 15 stationary, the fan being revolved by means of the rifled barrel and the corresponding shape of the head 16. When depressing the plunger, the fan is rotated and the stem 15 held stationary, and when elevating the plunger the blade 19 is withdrawn from the crease or groove 18, thereby permitting the fan to revolve without injurious strain such as would result if provision were not had for disconnecting the fan from its primary actuating mechanism. The blade 19 and the head 17 form in effect a clutch between the plunger and fan-operating stem and may be substituted by any well-known form of clutch which will automatically disengage its parts when relatively turning in one direction and cause the parts to move together when turning in the opposite direction.

The fan is located immediately below the compartment 2 and in line with the plunger 3, and when depressing the latter the charge of fertilizer or grain carried below the bottom of the compartment 2 in the slot or opening 6 is dropped and, falling upon the rapidly-rotating fan, is scattered and distributed upon the ground. The downward movement of the plunger, while effecting a dropping of the fertilizer or seed, at the same time results in a rotation of the fan through the instrumentalities herein set forth, and by reason of the clutch between the fan-operating stem and the plunger the latter can be returned to an initial position without checking the motion of the fan, as will be readily understood.

Having thus described the invention, what is claimed as new is—

1. In an implement for distributing fertilizer or seed, the combination of a plunger for effecting a discharge of the fertilizer or seed, a fan actuated by the plunger for scattering the charge, and a clutch between the plunger and fan, substantially as and for the purpose set forth.

2. In an implement for dropping fertilizer, &c., the combination of a plunger for delivering a charge when depressed, a fan having a rifled barrel and adapted to scatter the charge, a stem having a head operating in the rifled barrel to rotate it and the fan upon depressing the plunger, and a clutch between the plunger and the fan-operating stem, substantially as set forth for the purpose described.

3. In an implement for distributing fertilizer, &c., the combination of a plunger having an opening or slot to deliver a charge, a fan having a rifled barrel, a stem having a head corresponding to and operating in the rifled bore of the barrel, and having a head at its upper end formed with a transverse crease or groove, and having the portions upon opposite sides of the crease oppositely inclined from one end, and a blade carried by the plunger and adapted to coöperate with the upper head of the fan-operating stem, substantially as and for the purpose set forth.

FLAVIUS JOSEPHUS FRANCE.

Witnesses:
L. J. OLDHAM,
W. B. REEVES, Jr.